United States Patent
Yao et al.

(10) Patent No.: US 7,119,991 B2
(45) Date of Patent: Oct. 10, 2006

(54) SYSTEM AND METHOD FOR PREVENTING COMPUTER STORAGE MEDIA SURFACE CONTAMINANT ACCUMULATION AND FOR PREVENTING IMPACT-RELATED HEAD/SLIDER DAMAGE

(75) Inventors: Ming Gao Yao, Dongguan (CN); Masashi Shiraishi, Kowloon (JP); Yi Ru Xie, Dongguan (CN)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 268 days.

(21) Appl. No.: 10/436,425

(22) Filed: May 7, 2003

(65) Prior Publication Data
US 2004/0085677 A1 May 6, 2004

(30) Foreign Application Priority Data
Nov. 4, 2002 (CN) .................... PCT/CN02/00780

(51) Int. Cl.
*G11B 5/60* (2006.01)
(52) U.S. Cl. .................................. 360/236.3
(58) Field of Classification Search ............. 360/235.4
See application file for complete search history.

(56) References Cited

U.S. PATENT DOCUMENTS

| 5,751,517 | A | * | 5/1998 | Agarwal ................. 360/235.4 |
| 5,796,551 | A | | 8/1998 | Samuelson |
| 6,057,983 | A | | 5/2000 | Kajitani |
| 6,172,851 | B1 | | 1/2001 | Utsunomiya ............. 360/236.3 |
| 6,188,547 | B1 | | 2/2001 | Gui et al. ................ 360/236.5 |
| 6,198,606 | B1 | | 3/2001 | Boutaghou et al. ...... 360/294.3 |
| 6,233,118 | B1 | * | 5/2001 | Boutaghou et al. ...... 360/235.4 |
| 6,249,945 | B1 | * | 6/2001 | Lee ........................... 29/90.01 |
| 6,357,095 | B1 | * | 3/2002 | Duan et al. ................ 29/90.01 |
| 6,526,639 | B1 | * | 3/2003 | Duan et al. ................ 29/90.01 |
| 6,940,694 | B1 | * | 9/2005 | Ohwe et al. ............. 360/234.6 |
| 2003/0117927 | A1 | * | 6/2003 | Yee ............................. 369/72 |
| 2005/0099932 | A1 | * | 5/2005 | Yanagisawa ........... 369/112.01 |

FOREIGN PATENT DOCUMENTS

| CN | 1308334 A | 8/2001 |
| CN | 1336661 A | 2/2002 |
| JP | 2002-133803 | 5/2002 |

* cited by examiner

*Primary Examiner*—Allen Cao
(74) *Attorney, Agent, or Firm*—Kenyon & Kenyon LLP

(57) ABSTRACT

A system and method are disclosed for preventing computer storage media surface contaminant accumulation and for preventing impact-related head/slider damage. Such a system may include a component having a plurality of pads, where the component is to collect contaminants between a media surface and the component as the media and component move with respect to each other: and the contaminants are collected by the component via interaction between the number of pads and an airflow.

32 Claims, 7 Drawing Sheets

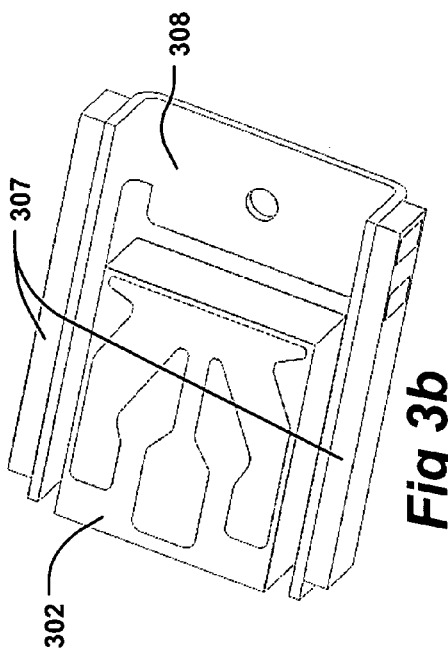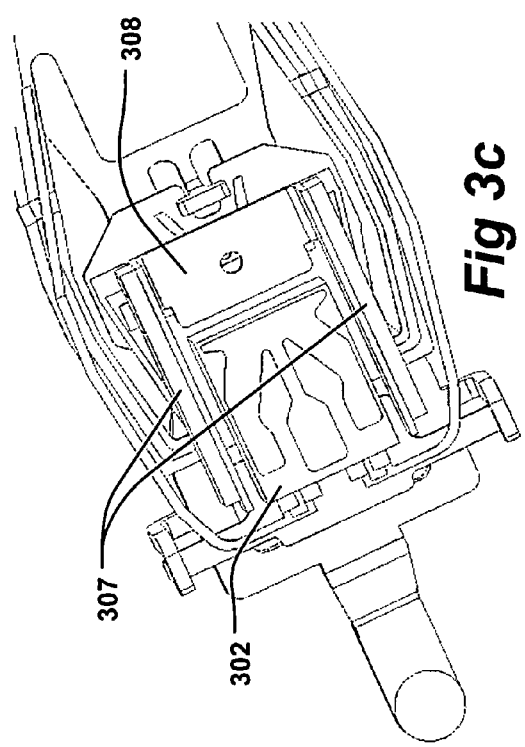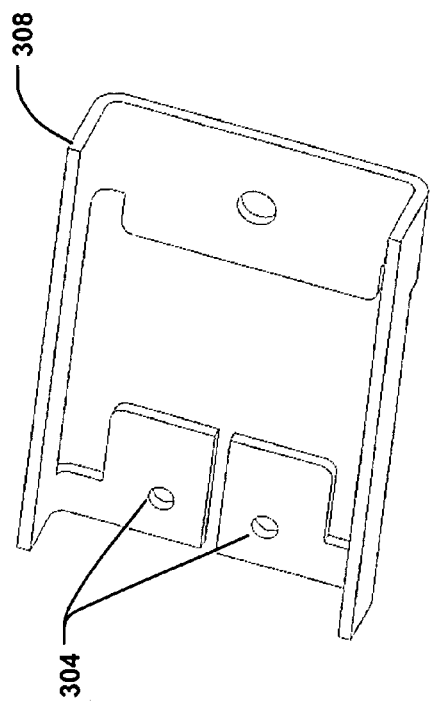

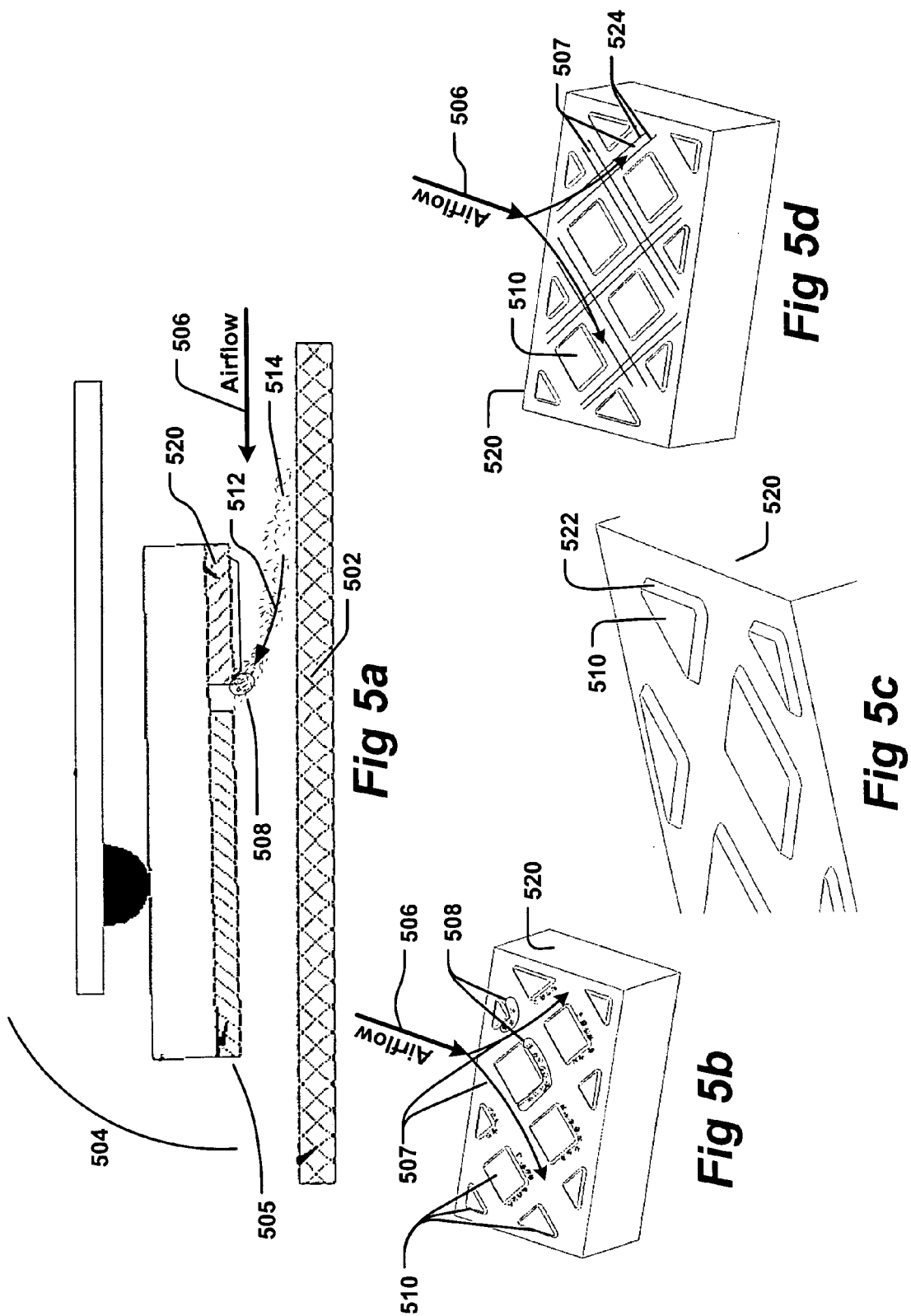

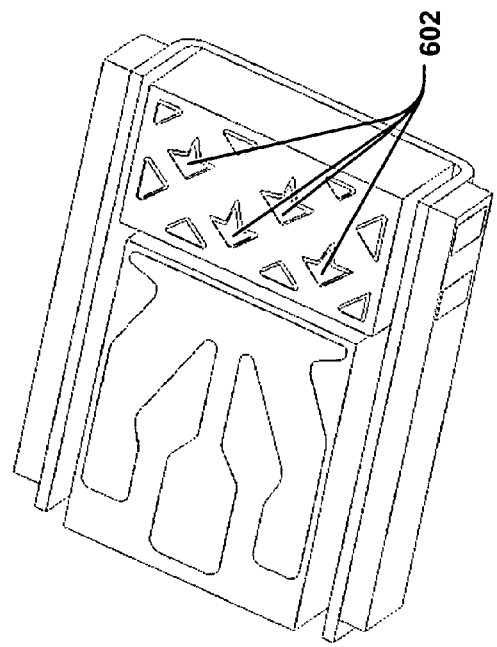
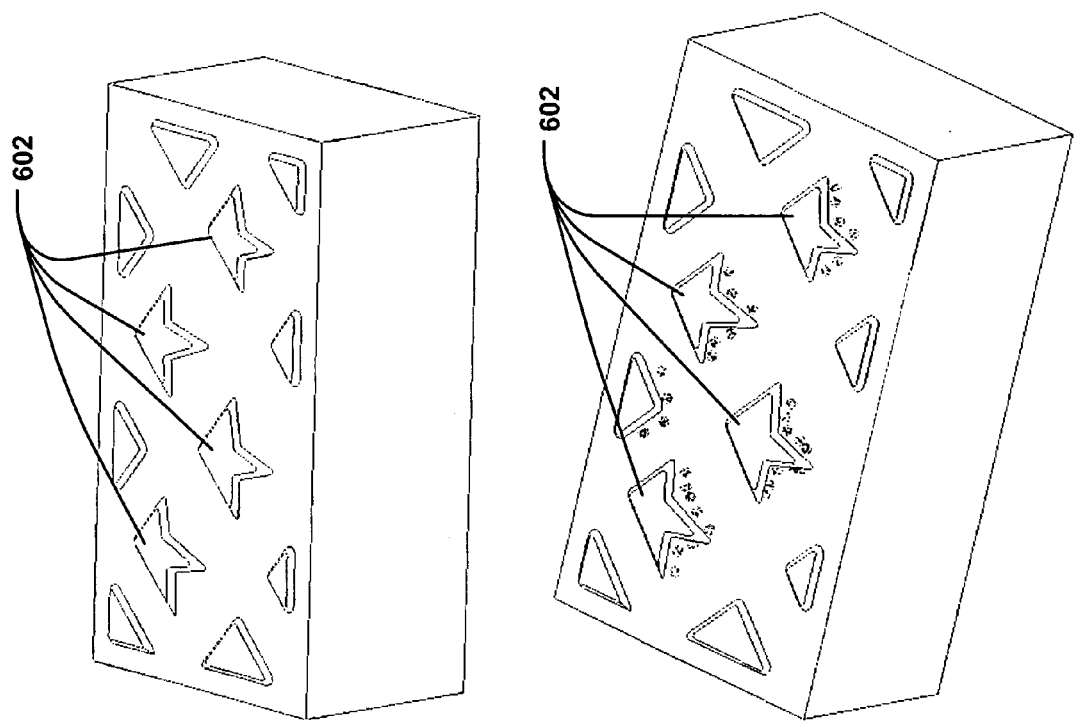
*Figure 6*

SYSTEM AND METHOD FOR PREVENTING COMPUTER STORAGE MEDIA SURFACE CONTAMINANT ACCUMULATION AND FOR PREVENTING IMPACT-RELATED HEAD/SLIDER DAMAGE

BACKGROUND INFORMATION

The present invention relates to magnetic hard disk drives. More specifically, the invention relates to a system for preventing disk surface particulate contamination and for preventing impact-related head/slider damage.

In the art today, different methods are utilized to improve recording density of hard disk drives. FIG. 1 provides an illustration of a typical drive arm configured to read from and write to a magnetic hard disk. Typically, a voice-coil motor (VCM) 102 is used for controlling the motion, across a magnetic hard disk 106, of an arm 104 of a hard drive. Because of the inherent tolerance (dynamic play) that exists in the placement of a recording head 108 by a VCM 102 alone, micro-actuators 110 are now being utilized to 'fine-tune' head 108 placement, as is described in U.S. Pat. No. 6,198,606. A VCM 102 is utilized for course adjustment and the micro-actuator 110 then corrects the placement on a much smaller scale to compensate for the tolerance of the VCM 102 (with the arm 104). This enables a smaller recordable track width, increasing the 'tracks per inch' (TPI) value of the hard drive (to provide an increased drive density).

FIG. 2 provides an illustration of a micro-actuator as used in the art. Typically, a slider 202 (containing a read/write magnetic head; not shown) is utilized for maintaining a prescribed flying height above the disk surface 106 (see FIG. 1). Micro-actuators may have flexible beams 204 connecting a support device 206 to a slider containment unit (such as a frame) 208 enabling slider 202 motion independent of the drive arm 104 (see FIG. 1). An electromagnetic assembly or an electromagnetic/ferromagnetic assembly (not shown) may be utilized to provide minute adjustments in orientation/location of the slider/head 202 with respect to the arm 104 (see FIG. 1).

As the scale of computer storage devices such as hard disk drives reduces, the importance of media surface contaminant removal increases. Particulate accumulation can adversely affect a hard drive's performance. It can cause problems such as disk surface abrasion, leading to data transfer (i.e., read/write) errors. Another problem facing storage devices such as hard disk drives is damage caused by impact between the head (slider) and disk. Such impact can cause damage to the head/slider, the disk, or both, which can also affect hard drive performance.

It is therefore desirable to have a system for preventing media surface contaminant accumulation and for preventing impact-related head/slider damage, as well as having additional benefits.

BRIEF DESCRIPTION OF THE DRAWINGS

FIG. 3 provides illustrations of a hard disk drive head-gimbal assembly (HGA) with a micro-actuator.

FIG. 5 further illustrates aspects of the component according to an embodiment of the present invention.

FIG. 6 provides illustrations of another pad shape according to an embodiment of the present invention.

DETAILED DESCRIPTION

Figure 1:
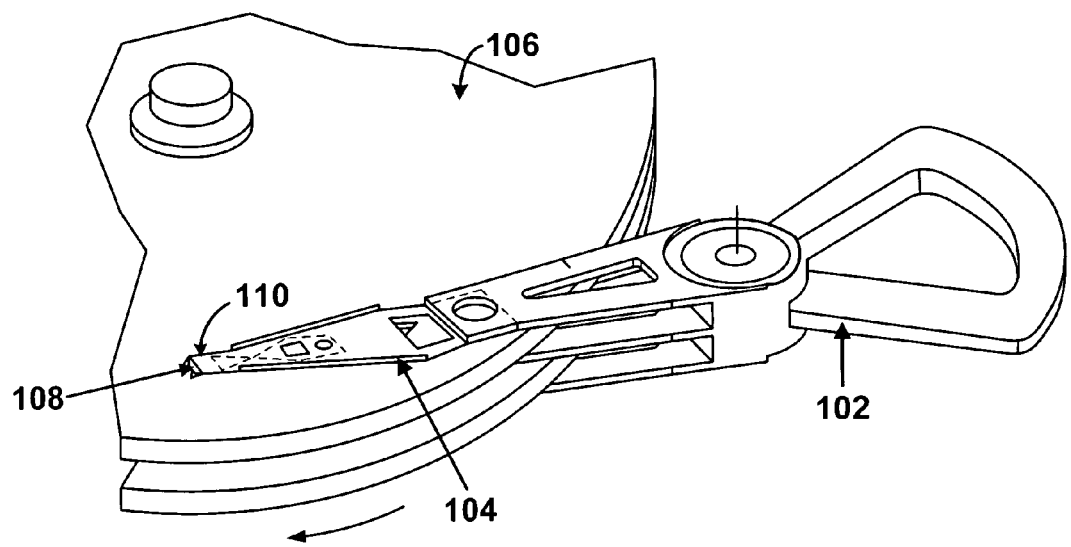
FIG. 1 provides an illustration of a typical drive arm configured to read from and write to a magnetic hard disk.
Figure 2:
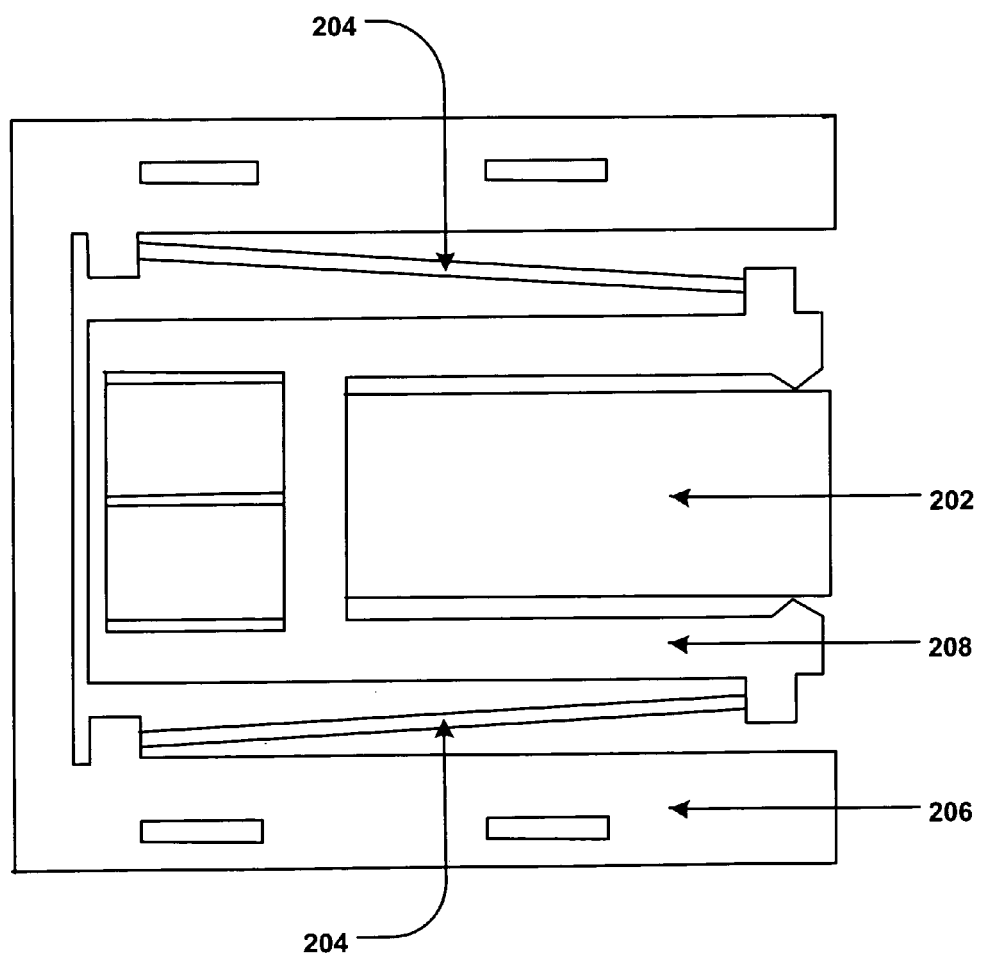
FIG. 2 provides an illustration of a micro-actuator as used in the art.

FIG. 3 provides illustrations of a hard disk drive head-gimbal assembly (HGA) with a micro-actuator. As shown in FIG. 3a, a slider (with read/write head) 302 may be bonded at two points 304 to a micro-actuator frame 308. As shown in FIGS. 3b and 3c, the micro-actuator may have a piezoelectric PZT (Piezoelectric Transducer) beam 307 on each side of the frame 308, providing micro-actuation of the slider 302 by electrically-induced flexure of the beams 307.

Figure 4C:
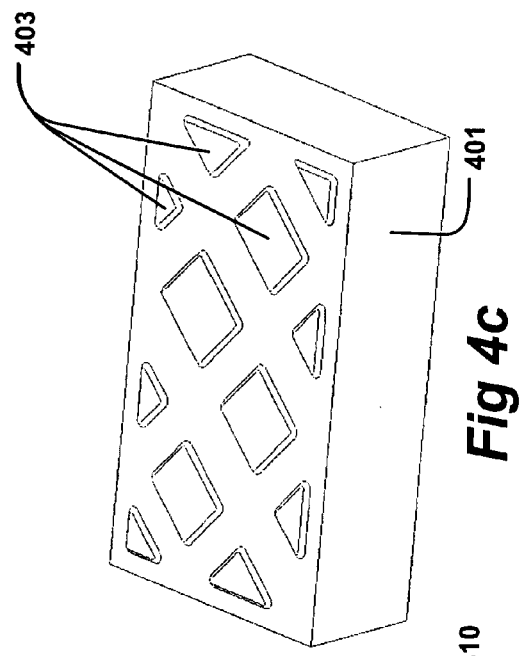
FIG. 4 provides illustrations of an HGA with a particle catcher/impact shield (component) according to an embodiment of the present invention.
Figure 4A:
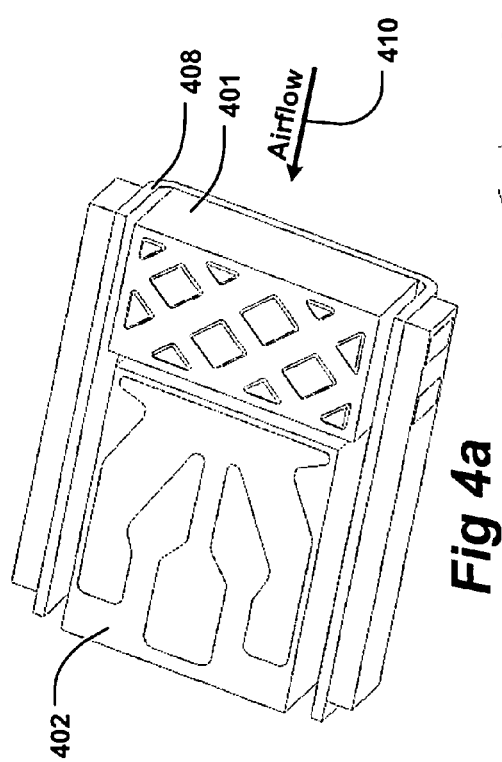
Figure 4B:
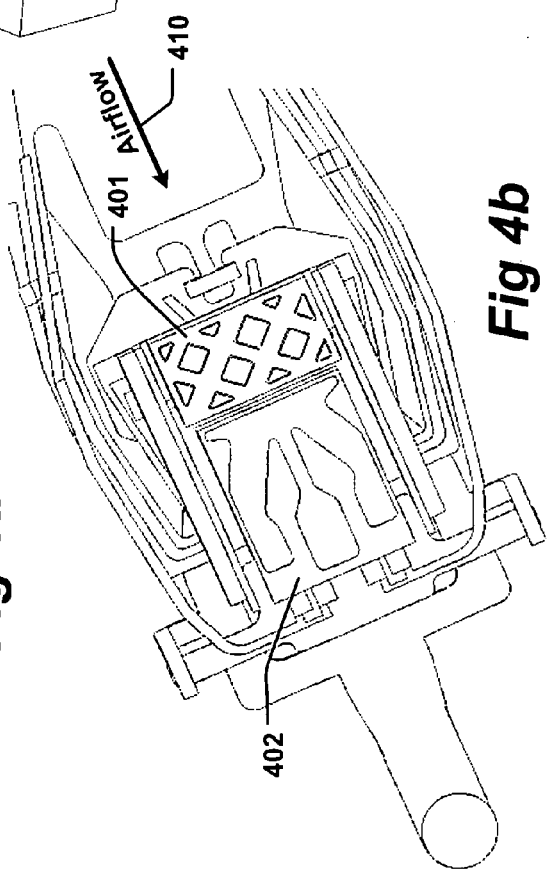

FIG. 4 provides illustrations of an HGA with a particle catcher/impact shield (component) according to an embodiment of the present invention. As shown in FIGS. 4a and 4b, in one embodiment, a particle catcher/impact shield (component) 401 may be coupled to a micro-actuator frame 408. In this embodiment, the component 401 may be made of a material such as ceramic, Aluminum-Titanium-Carbon (Al-TiC), or Aluminum (Al). It may be coupled to the frame 408 by a substance such as resin, epoxy, or adhesive film. As shown in FIG. 4c, in an embodiment, the component 401 has one or more pads 403 to collect contaminants and prevent slider/media impact (explained below). In this embodiment, the component 401 is located in front of the magnetic head 402 (on the leading edge of the micro-actuator) with respect to airflow 410 created by disk motion. This allows for contaminants to be removed before the head/slider 402 passes over them (explained further below).

FIG. 5 further illustrates aspects of the component according to an embodiment of the present invention. As shown in FIGS. 5a and 5b, in one embodiment, as the disk 502 moves with respect to the HGA 504, low-pressure areas 508 are created behind the pads 510 due to the airflow 506. In this embodiment, the low-pressure areas 508 create a pressure differential 512 between the regions of pre-existing contaminants (surface and/or airborne) 514 and the low-pressure areas 508, causing the contaminants to be drawn to the low-pressure areas 508. In one embodiment, the contaminants remain in the low-pressure areas 508 until the head/slider 505 is moved beyond the perimeter of the moving disk (e.g., upon spin down), whereupon the airflow ceases and the vacuum is lost, causing the contaminants to fall (away from the disk).

In this embodiment, the existence and location of the component 520 prevents damage to the head/slider 505 upon impact with the disk surface 502. The component shields the slider 505 from impact as well as reinforcing the structure. As shown in FIG. 5c, in one embodiment, the edges (side walls) 522 of the pads may be inclined to improve the flow characteristics of the component 520 and thus, flying stability. Also to improve flying stability, as shown in FIG. 5d, a number of linear indentions 524 may be provided in the pathways 507 between the pads 510 parallel to the airflow. Further, the indentions 524 provide additional surface area (recessed) for the collection of contaminants.

FIG. 6 provides illustrations of another pad shape according to an embodiment of the present invention. In one embodiment, a number of the pads 602 are a six-sided shapes, similar to the silhouette of a Manta Ray fish ('manta ray'-shaped). As shown above, pads may be of other shapes, such as rectangular or triangular.

Figure 7:
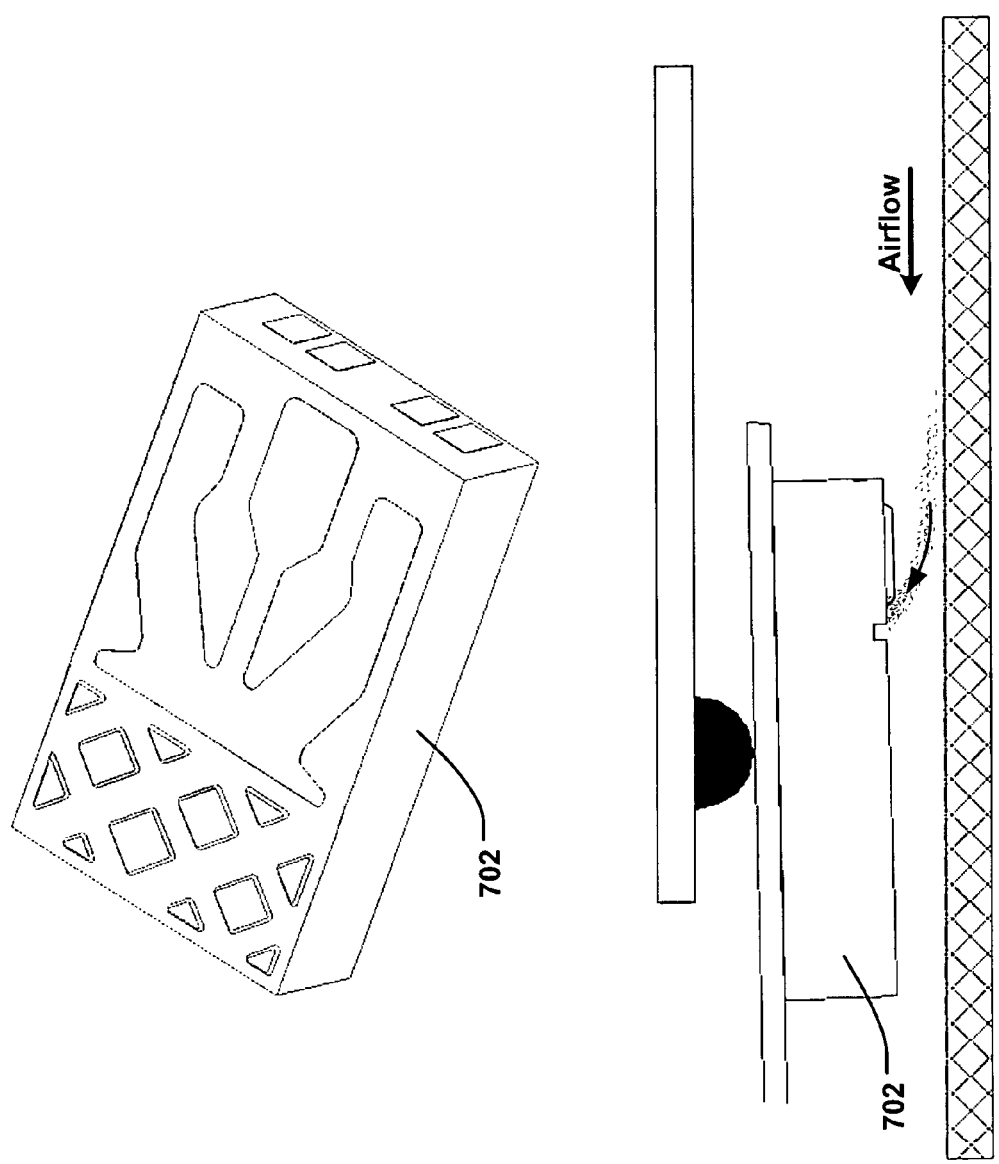
FIG. 7 provides illustrations of an integrated component according to an embodiment of the present invention.

FIG. 7 provides illustrations of an integrated component according to an embodiment of the present invention. In one embodiment, the component and the slider are one integrated structure 702. This embodiment may be useful for structure simplification in hard drive systems not utilizing micro-actuation.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system for a data storage device comprising:
a component having a plurality of pads, wherein said component is to collect contaminants between a media surface and said component as the media and component move with respect to each other; and
said contaminants being collected by said component via interaction between said number of pads and an airflow wherein said contaminants are drawn into a number of low-pressure areas for collection, each low-pressure area being associated to each of said plurality of pads.

2. The system of claim 1, wherein each low-pressure area is at a trailing edge of each of said plurality of pads.

3. The system of claim 1, wherein a number of said pads are of a shape selected from the group consisting of rectangular, triangular, and 'manta ray'-shaped.

4. The system of claim 1, wherein a number of said pads form a number of pathways between said pads.

5. The system of claim 4, wherein said number of said pathways are diagonal to said airflow.

6. The system of claim 4, wherein said number of said pathways include scribed, linear indentions, each indention parallel to its respective pathway.

7. The system of claim 1, wherein a number of said pads have inclined side walls.

8. The system of claim 1, wherein said component is of a material selected from the group consisting of Aluminum-Titanium-Carbon (AlTiC), Ceramic, and Aluminum.

9. The system of claim 1, wherein said component is a hard disk drive head component having a head-gimbal assembly (HGA).

10. The system of claim 9, wherein said media is a hard disk drive platter.

11. The system of claim 9, wherein said component is coupled directly to said HGA.

12. The system of claim 9, wherein said component is coupled to a hard drive micro-actuator frame.

13. The system of claim 12, wherein said component is coupled to said micro-actuator frame by a material selected from the group consisting of resin, epoxy, and adhesive film.

14. The system of claim 9, wherein said component is a part of a hard drive slider.

15. The system of claim 9, wherein a number of said pads are positioned to protect said HGA from damage by impact with said media surface.

16. The system of claim 9, wherein said component is located on the leading edge of said HGA with respect to a hard drive head.

17. A method for manufacturing a data storage device comprising:
providing a component having a plurality of pads, wherein contaminants between a media surface and said component are to be collected via interaction between said plurality of pads and an airflow created by motion of said media with respect to said component wherein said contaminants are drawn into a number of low-pressure areas for collection, each low-pressure area being near each of said plurality of pads.

18. The method of claim 17, wherein each low-pressure area is at a trailing edge of each of said plurality of pads.

19. The method of claim 17, wherein a number of said pads are of a shape selected from the group consisting of rectangular, triangular, and 'manta ray'-shaped.

20. The method of claim 17, wherein a number of said pads form a number of pathways between said pads.

21. The method of claim 20, wherein said number of said pathways are diagonal to said airflow.

22. The method of claim 20, wherein said number of said pathways include scribed, linear indentions, each indention parallel to its respective pathway.

23. The method of claim 17, wherein a number of said pads have inclined side walls.

24. The method of claim 17, wherein said component is of a material selected from the group consisting of Aluminum-Titanium-Carbon (AlTiC), Ceramic, and Aluminum.

25. The method of claim 17, wherein said component is a hard disk drive head component having a head-gimbal assembly (HGA).

26. The method of claim 25, wherein said media is a bard disk drive platter.

27. The method of claim 25, wherein said component is coupled directly to said HGA.

28. The method of claim 25, wherein said component is coupled to a hard drive micro-actuator frame.

29. The method of claim 28, wherein said component is coupled to said micro-actuator frame by a material selected from the group consisting of resin, epoxy, and adhesive film.

30. The method of claim 25, wherein said component is a part of a hard drive slider.

31. The method of claim 25, wherein a number of said pads are positioned to protect said HGA from damage by impact with said media surface.

32. The method of claim 25, wherein said component is located on the leading edge of said HGA with respect to a hard drive head.

* * * * *

UNITED STATES PATENT AND TRADEMARK OFFICE
CERTIFICATE OF CORRECTION

PATENT NO. : 7,119,991 B2 Page 1 of 1
APPLICATION NO. : 10/436425
DATED : October 10, 2006
INVENTOR(S) : Ming Gao Yao et al.

It is certified that error appears in the above-identified patent and that said Letters Patent is hereby corrected as shown below:

Front Page, Inventors, "Kowloon (JP)"
should be --Kowloon (HK)--

Front Page, Abstract, Line 7 "respect to each other:"
should be --respect to each other,--

Column 3, Line 23 "associated to"
should be --associated with--

Column 4, Line 38 "bard"
should be --hard--

Signed and Sealed this

Twenty-third Day of June, 2009

JOHN DOLL
*Acting Director of the United States Patent and Trademark Office*